United States Patent
Hopkins

(10) Patent No.: US 8,156,175 B2
(45) Date of Patent: *Apr. 10, 2012

(54) SYSTEM AND METHOD FOR SEARCHING FOR SPECIFIC TYPES OF PEOPLE OR INFORMATION ON A PEER-TO-PEER NETWORK

(75) Inventor: Samuel P. Hopkins, Freedom, PA (US)

(73) Assignee: Tiversa Inc., Moon Township, PA (US)

( * ) Notice: Subject to any disclaimer, the term of this patent is extended or adjusted under 35 U.S.C. 154(b) by 952 days.

This patent is subject to a terminal disclaimer.

(21) Appl. No.: 11/103,672

(22) Filed: Apr. 12, 2005

(65) Prior Publication Data

US 2006/0117372 A1 Jun. 1, 2006

Related U.S. Application Data

(63) Continuation-in-part of application No. 10/764,111, filed on Jan. 23, 2004, now Pat. No. 7,761,569.

(51) Int. Cl.
G06F 15/16 (2006.01)
(52) U.S. Cl. .................................. 709/203; 709/200
(58) Field of Classification Search .................... 709/203
See application file for complete search history.

(56) References Cited

U.S. PATENT DOCUMENTS

| 111,604 A | 2/1871 | Bailey |
| 5,233,604 A | 8/1993 | Ahmadi et al. |
| 5,600,638 A | 2/1997 | Bertin et al. |
| 5,794,254 A | 8/1998 | McClain |
| 5,949,760 A | 9/1999 | Stevens et al. |
| 5,987,011 A | 11/1999 | Toh |
| 6,052,785 A * | 4/2000 | Lin et al. ........................... 726/5 |
| 6,069,896 A | 5/2000 | Borgstahl et al. |
| 6,076,088 A | 6/2000 | Paik et al. |
| 6,147,971 A | 11/2000 | Rochberger et al. |
| 6,205,146 B1 | 3/2001 | Rochberger et al. |

(Continued)

FOREIGN PATENT DOCUMENTS

EP 1107512 A1 6/2001

(Continued)

OTHER PUBLICATIONS

United States House of Representatives Committee on Government Reform—Staff Report Prepared for Rep. Tom Davis and Rep. Henry A. Waxman, "File-Sharing Programs and Peer-To-Peer Networks Provacy and Security Risks", May 13, 2003, pp. 1-12.*

(Continued)

*Primary Examiner* — John Follansbee
*Assistant Examiner* — Anthony Mejia
(74) *Attorney, Agent, or Firm* — Hamilton, Brook, Smith & Reynolds, P.C.

(57) ABSTRACT

The present invention provides a system and a method for searching for specific types of people or specific types of information on a Peer-to-Peer network, and in particular, using specific types of search terms as a means of profiling to find specific types of information or specific types of people on a Peer-to-Peer network. When a specific type of person or specific type of information is needed, a specific type of search term is issued on the Peer-to-Peer network. If that specific type of person or specific type of information is available a response will be received.

12 Claims, 7 Drawing Sheets

U.S. PATENT DOCUMENTS

| | | | |
|---|---|---|---|
| 6,397,246 B1 | 5/2002 | Wolfe | |
| 6,483,808 B1 | 11/2002 | Rochberger et al. | |
| 6,611,196 B2* | 8/2003 | Mynatt et al. | 340/5.8 |
| 6,668,289 B2 | 12/2003 | Cheng et al. | |
| 6,732,180 B1 | 5/2004 | Hale et al. | |
| 6,742,023 B1 | 5/2004 | Fanning et al. | |
| 6,757,684 B2 | 6/2004 | Svendsen et al. | |
| 6,839,769 B2 | 1/2005 | Needham et al. | |
| 6,855,660 B2 | 2/2005 | Tsou et al. | |
| 6,918,113 B2 | 7/2005 | Patel et al. | |
| 6,941,472 B2* | 9/2005 | Moriconi et al. | 726/11 |
| 6,965,591 B1 | 11/2005 | Roy | |
| 6,983,320 B1 | 1/2006 | Thomas et al. | |
| 7,003,514 B2 | 2/2006 | Dutta et al. | |
| 7,010,534 B2 | 3/2006 | Kraft | |
| 7,027,994 B2* | 4/2006 | Verdi et al. | 705/7.11 |
| 7,035,653 B2* | 4/2006 | Simon et al. | 455/466 |
| 7,051,102 B2 | 5/2006 | Gupta et al. | |
| 7,089,301 B1 | 8/2006 | Labio et al. | |
| 7,120,145 B2 | 10/2006 | Ohba et al. | |
| 7,120,619 B2* | 10/2006 | Drucker et al. | 706/45 |
| 7,167,979 B2 | 1/2007 | Xu et al. | |
| 7,185,011 B1 | 2/2007 | Dujari | |
| 7,277,946 B2 | 10/2007 | Humphrey et al. | |
| 7,308,445 B2* | 12/2007 | Bharat et al. | 1/1 |
| 7,318,092 B2 | 1/2008 | Sutler | |
| 7,325,042 B1* | 1/2008 | Soscia et al. | 709/219 |
| 7,418,455 B2* | 8/2008 | Fan et al. | 1/1 |
| 7,441,180 B1* | 10/2008 | Kaczmarek et al. | 715/201 |
| 7,493,363 B2 | 2/2009 | Huitema et al. | |
| 7,583,682 B2 | 9/2009 | Hopkins | |
| 7,600,033 B2 | 10/2009 | Bauer et al. | |
| 7,703,040 B2* | 4/2010 | Cutrell et al. | 715/792 |
| 7,743,044 B1 | 6/2010 | Kalogeraki et al. | |
| 7,761,569 B2 | 7/2010 | Hopkins | |
| 7,783,749 B2 | 8/2010 | Hopkins | |
| 2001/0003191 A1 | 6/2001 | Kovacs et al. | |
| 2001/0037325 A1* | 11/2001 | Biderman et al. | 707/1 |
| 2001/0045949 A1* | 11/2001 | Chithambaram et al. | 345/418 |
| 2002/0065748 A1* | 5/2002 | Taniguchi et al. | 705/27 |
| 2002/0065832 A1 | 5/2002 | Mack | |
| 2002/0069098 A1 | 6/2002 | Schmidt | |
| 2002/0073204 A1 | 6/2002 | Dutta et al. | |
| 2002/0087885 A1 | 7/2002 | Peled et al. | |
| 2002/0138471 A1 | 9/2002 | Dutta et al. | |
| 2002/0143989 A1 | 10/2002 | Huitema et al. | |
| 2002/0152262 A1 | 10/2002 | Arkin et al. | |
| 2002/0161844 A1 | 10/2002 | Overtoom | |
| 2002/0181395 A1 | 12/2002 | Foster et al. | |
| 2002/0184310 A1 | 12/2002 | Traversat et al. | |
| 2002/0188735 A1* | 12/2002 | Needham et al. | 709/229 |
| 2003/0005035 A1 | 1/2003 | Rodgers | |
| 2003/0037167 A1 | 2/2003 | Garcia-Luna-Aceves et al. | |
| 2003/0050966 A1 | 3/2003 | Dutta et al. | |
| 2003/0050980 A1 | 3/2003 | Dutta et al. | |
| 2003/0055892 A1 | 3/2003 | Huitema et al. | |
| 2003/0078889 A1 | 4/2003 | Lee et al. | |
| 2003/0088544 A1 | 5/2003 | Kan et al. | |
| 2003/0095660 A1 | 5/2003 | Lee et al. | |
| 2003/0112823 A1 | 6/2003 | Collins et al. | |
| 2003/0126136 A1* | 7/2003 | Omoigui | 707/10 |
| 2003/0135495 A1* | 7/2003 | Vagnozzi | 707/3 |
| 2003/0145093 A1 | 7/2003 | Oren et al. | |
| 2003/0182428 A1* | 9/2003 | Li et al. | 709/227 |
| 2003/0191828 A1 | 10/2003 | Ramanathan et al. | |
| 2003/0195852 A1 | 10/2003 | Campbell et al. | |
| 2003/0202468 A1 | 10/2003 | Cain et al. | |
| 2003/0208621 A1 | 11/2003 | Bowman | |
| 2003/0212710 A1 | 11/2003 | Guy | |
| 2004/0019650 A1* | 1/2004 | Auvenshine | 709/206 |
| 2004/0030651 A1 | 2/2004 | Kim et al. | |
| 2004/0039921 A1 | 2/2004 | Chuang | |
| 2004/0044790 A1 | 3/2004 | Loach et al. | |
| 2004/0044996 A1 | 3/2004 | Atallah | |
| 2004/0088347 A1 | 5/2004 | Yeager et al. | |
| 2004/0098370 A1 | 5/2004 | Garland et al. | |
| 2004/0103297 A1* | 5/2004 | Risan et al. | 713/200 |
| 2004/0111604 A1 | 6/2004 | Fournier | |
| 2004/0122958 A1 | 6/2004 | Wardrop | |
| 2004/0139211 A1* | 7/2004 | Baker et al. | 709/230 |
| 2004/0148275 A1* | 7/2004 | Achlioptas | 707/3 |
| 2004/0148434 A1 | 7/2004 | Matsubara et al. | |
| 2004/0153472 A1* | 8/2004 | Rieffanaugh, Jr. | 707/104.1 |
| 2004/0153658 A1 | 8/2004 | Gunyakti et al. | |
| 2004/0157641 A1* | 8/2004 | Chithambaram et al. | 455/556.2 |
| 2004/0158630 A1 | 8/2004 | Chang et al. | |
| 2004/0162871 A1 | 8/2004 | Pabla et al. | |
| 2004/0218532 A1 | 11/2004 | Khirman | |
| 2004/0220926 A1 | 11/2004 | Lamkin et al. | |
| 2004/0230572 A1* | 11/2004 | Omoigui | 707/3 |
| 2004/0236945 A1 | 11/2004 | Risan et al. | |
| 2004/0250106 A1 | 12/2004 | Annese et al. | |
| 2004/0250122 A1 | 12/2004 | Newton | |
| 2004/0260761 A1* | 12/2004 | Leaute et al. | 709/201 |
| 2004/0260801 A1 | 12/2004 | Li | |
| 2005/0028012 A1* | 2/2005 | Amamiya et al. | 713/201 |
| 2005/0038898 A1 | 2/2005 | Mittig et al. | |
| 2005/0043548 A1 | 2/2005 | Cates | |
| 2005/0047390 A1 | 3/2005 | Park et al. | |
| 2005/0060297 A1 | 3/2005 | Najork | |
| 2005/0080858 A1 | 4/2005 | Pessach | |
| 2005/0091167 A1 | 4/2005 | Moore et al. | |
| 2005/0091202 A1* | 4/2005 | Thomas | 707/3 |
| 2005/0091397 A1 | 4/2005 | Roberts et al. | |
| 2005/0108203 A1 | 5/2005 | Tang et al. | |
| 2005/0108248 A1 | 5/2005 | Natunen | |
| 2005/0114709 A1 | 5/2005 | Moore | |
| 2005/0119998 A1 | 6/2005 | Greco et al. | |
| 2005/0125560 A1* | 6/2005 | Brockway et al. | 709/249 |
| 2005/0125673 A1* | 6/2005 | Cheng et al. | 713/182 |
| 2005/0144288 A1 | 6/2005 | Liao | |
| 2005/0163050 A1 | 7/2005 | Hopkins | |
| 2005/0163133 A1 | 7/2005 | Hopkins | |
| 2005/0163135 A1 | 7/2005 | Hopkins | |
| 2005/0187942 A1 | 8/2005 | Dutta et al. | |
| 2005/0203851 A1 | 9/2005 | King et al. | |
| 2005/0203892 A1 | 9/2005 | Wesley et al. | |
| 2005/0229243 A1 | 10/2005 | Svendsen et al. | |
| 2005/0229255 A1 | 10/2005 | Gula et al. | |
| 2005/0267945 A1 | 12/2005 | Cohen et al. | |
| 2006/0034177 A1 | 2/2006 | Schrempp | |
| 2006/0117372 A1 | 6/2006 | Hopkins | |
| 2006/0129555 A1 | 6/2006 | Burdick et al. | |
| 2006/0136837 A1* | 6/2006 | Ben-Shachar et al. | 715/783 |
| 2006/0209819 A1 | 9/2006 | Jennings et al. | |
| 2006/0248062 A1 | 11/2006 | Libes et al. | |
| 2006/0282309 A1 | 12/2006 | Zhang et al. | |
| 2007/0124721 A1* | 5/2007 | Cowing et al. | 717/100 |
| 2007/0153703 A1 | 7/2007 | Floyd et al. | |
| 2007/0153710 A1 | 7/2007 | Hopkins | |
| 2007/0162463 A1* | 7/2007 | Kester et al. | 707/10 |
| 2008/0163202 A1* | 7/2008 | Kembel et al. | 717/178 |
| 2008/0319861 A1 | 12/2008 | Hopkins | |
| 2009/0024618 A1* | 1/2009 | Fan et al. | 707/5 |
| 2010/0042732 A1 | 2/2010 | Hopkins | |

FOREIGN PATENT DOCUMENTS

| | | |
|---|---|---|
| JP | 07-079249 | 3/1995 |
| WO | WO 03/009524 A2 | 1/2003 |
| WO | WO 2005/074229 A1 | 8/2005 |
| WO | WO 2005/074230 A2 | 8/2005 |
| WO | WO 2006/124027 A1 | 11/2006 |

OTHER PUBLICATIONS

United States General Accounting Office, Report to the Chairman and Ranking Minority Member, Committee on Government Reform, House of Representatives, File Sharing Programs—Peer-To-Peer Networks Provide Ready Access to Child Pornography, Feb. 2003, pp. 1-32.*

Couch, William, "Peer-To-Peer File-Sharing Networks: Security Risks", SANS Institute InfoSec Reading Room, 2002, pp. 1-11.*

Davidson, Alan, "Peer-to-Peer File Sharing Privacy and Security", Center for Democracy and Technology, May 15, 2003, pp. 1-16.*

AA-2002.02—File Sharing Activity Part 1 of 2—Security implications of Using peer-to-peer file sharing software, May 12, 2002, pp. 1-5.*

Phemus, "Secret Manual for Downloading: Final Second Part of Answers to Questions for Downloading", PC Japan, vol. 5, 11, pp. 174-179, Nov. 1, 2000.

Zhu, et al., "SDQE: Towards Automatic Semantic Query Optimization in P2P Systems," *Information Processing & Management*, 42(1), pp. 222-236 Oct. 26, 2004.

Kim, K., and Park, D., "Subway: Peer/to/Peer Clustering of Clients for Web Proxy," Department of Electrical Engineering and Computer Science, 8 pages, Retrieved from Internet on Sep. 25, 2007.

Goel, S., et al., "A Resilient Network That Can Operate Under Duress: To Support Communication Between Government Agencies during Crisis Situations," IEEE, Proceedings of the 37th Annual Hawaii International Conference pp. 1-11, Jan. 2004.

*Tiversa, Inc., et al v. Cohen & Grigsby, P.C.*, Civil Division, Case No. GD 07/001515, Court of Common Pleas of Allegheny County, Pennsylvania, "Complaint," 89 pages, dated Sep. 5, 2007.

*Tiversa, Inc., et al v. Cohen & Grigsby, P.C.*, Court of Common Pleas of Allegheny County, Pennsylvania, "Preliminary Objections and Brief in Support of Preliminary Objections," 18 pages, dated Oct. 15, 2007.

*Tiversa, Inc., et al v. Cohen & Grigsby, P.C.*, Court of Common Pleas of Allegheny County, Pennsylvania, "First Amended Complaint," 90 pages, dated Nov. 5, 2007.

*Tiversa, Inc., et al v. Cohen & Grigsby, P.C.*, Civil Division, Case No. GD 07/001515, Court of Common Pleas of Allegheny County, Pennsylvania, "Defendant's Preliminary Objections to First Amended Complaint and Brief in Support," 14 pages, dated Nov. 21, 2007.

*Tiversa, Inc., et al v. Cohen & Grigsby, P.C.*, Civil Division, Case No. GD 07/001515, Court of Common Pleas of Allegheny County, Pennsylvania, "Court Order re: Defendant's Preliminary Objections to First Amended Complaint and Brief in Support," 14 pages, dated Nov. 27, 2007.

*Tiversa, Inc., et al v. Cohen & Grigsby, P.C.*, Civil Division, Case No. GD 07/001515, Court of Common Pleas of Allegheny County, Pennsylvania, "Second Amended Complaint," 89 pages, dated Dec. 11, 2007.

*Tiversa, Inc., et al v. Cohen & Grigsby, P.C.*, Civil Division, Case No. GD 07/001515, Court of Common Pleas of Allegheny County, Pennsylvania, "Answer to Second Amended Complaint," 454 pages, dated Jan. 30, 2008.

*Tiversa, Inc., et al v. Cohen & Grigsby, P.C.*, Civil Division, Case No. GD 07/001515, Court of Common Pleas of Allegheny County, Pennsylvania, "Reply to New Matter," 16 pages, dated Feb. 19, 2008.

Notification Concerning Transmittal of International Preliminary Report on Patentability and Written Opinion for PCT/US2008/007262, date of mailing: Feb. 2, 2010 (6 pages).

Notification Relating to Priority Claim and Notification Concerning Submission or Transmittal of Priority Document with Partial International Search Report for PCT/US2005/001623, date of mailing: Jul. 12, 2005, (7 pages).

Notification Concerning Transmittal of International Preliminary Report on Patentability and Written Opinion for PCT/US2005/001623, date of mailingJul. 24, 2006 (7 pages).

Notification of Transmittal of the International Search Report and Written Opinion of the International Searching Authority for PCT/US2005/001623, date of mailing: Jul. 25, 2005 (26 pages).

Microsoft TechNet, Changes to Functionality in Microsoft Windows XP Service Pack 2, Introduction [online Retrieved on Oct. 26, 2007] Retrieved from URL: http://technet.microsoft.com/en-us/library/bb457151(d=printer).aspx. pp. 1-3.

Microsoft TechNet, Changes to Functionality in Microsoft Windows XP Service Pack 2, Part 2: Network Protection Technologies [online Retrieved on Oct. 26, 2007] Retrieved from URL: http://technet.microsoft.com/en-us/library/bb457156(d=printer).aspx. pp. 1-37.

Non-Final Office Action received on U.S. Appl. No. 12/814,889. Mail Date: May 18, 2011.

Notice of Allowance and Fees Due on U.S. Appl. No. 12/814,889. Mail Date: Oct. 19, 2011.

Li,Z., et al., "Research of Peer-to-Peer Network Architecture," Proceedings of ICCT, pp. 312-315, 2003.

Lui, S.M. and Kowk, S.H., "Interoperability of Peer-to-Peer File Sharing Protocols," ACM SIGecom Exchanges 3(3): 25-33 (2002).

Takako, Kansai, *"to communicate over NAT" to open the door to IP telephone, various technologies on router, and expected UPnP still lack ability* ( an article of a magazine), Nikkei Communications, Jun. 3, 2002, vol. 367, pp. 51-53.

Zupeng Li et al., "Research of Peer-to-Peer Network Architecture," Proceedings of ICCT2003, pp. 312-315.

Marmor, Michael S., "Make the P2P Lead with Toadnode," www.webtecniques.com, Dec. 2000, pp. 44-49.

Ueda, Kiyoshi et al., "Peer-to-Peer Network Topology Control within a Mobile Ad-hoc Network," 2003 IEEE, pp. 243-247.

Liu, Jiangchuan, et al., "Distributed Distance Measurement for Large-Scale Networks," Computer Networks 41 (2003) 177-192.

Siu Man Lui and Sai Ho Kowk, "Interoperability of Peer-To-Peer File Sharing," ACM SlGecom Exchanges, vol. 3, No. 3, Aug. 2002, pp. 25-33.

Zhenyun Zhuang et al., "Hyrid Periodical Flooding in Unstructured Peer-to-Peer Networks," Proceedings of the 2003 International Conference on Parallel Proceeding.

Steven Hessing, "Peer to Peer Messaging Protocol," Internet-Draft, Apr. 2002, pp. 1-57.

\* cited by examiner

SYSTEM AND METHOD FOR SEARCHING FOR SPECIFIC TYPES OF PEOPLE OR INFORMATION ON A PEER-TO-PEER NETWORK

RELATED PATENT APPLICATION

This is a continuation-in-part of U.S. patent application Ser. No. 10/764,111 filed on Jan. 23, 2004 now U.S. Pat. No. 7,761,569 entitled "Method for Monitoring and Providing Information Over a Peer to Peer Network.

FIELD OF THE INVENTION

The present invention provides a system for searching for specific types of people or specific types of information on a Peer-to-Peer network, and in particular, using specific types of search terms as a means of profiling to find specific types of information or specific types of people on a Peer-to-Peer network. A method for searching for specific types of people or information on a Peer-to-Peer network is also provided.

BACKGROUND OF THE INVENTION

As used herein, peer to peer networks which are the subject of the present invention comprise multiple nodes, each node typically consisting both of file server and client which can send and receive data or "Communication messages" to or from a node to which such is connected.

In a peer to peer network each node is connected to other nodes over a communication medium such as the internet either directly or through some type of proxy. For example, when a search request is issued such originating node sends a search request to all of the nodes to which it is connected. (see FIG. 1) These nodes search their list of available files and if a match is found they send a response back with the location. However, a peer to peer proxy network typically consists of node A which is connected to a node B and node B is connected to a node C. (see FIG. 2) Node A is not connected to node C such that if node A issues a search request it will be forwarded to node B and Node B will search its available files and if a match is found it will send a response back to node A. Node B will then forward node A's request to node C and Node C will search its available files and if a match is found it will send a response back to node B. Node B will then forward this response to node A. FIG. 3 discloses a nonproxy loop network wherein each node is directly connected to another.

Some peer to peer networks utilize a leaf node/main node proxy topology (See FIG. 4) where some nodes are classified as main nodes and the remaining nodes are classified as leaf nodes. Leaf nodes can only connect to main nodes. Only main nodes can connect to other main nodes. When a leaf node issues a search request it sends the request to the main node that it is connected to. The main node then forwards the request to any other leaf nodes that are connected to it and also to any main nodes it is connected to. These main nodes forward the request to any leaf nodes that are connected to them.

Commonly these networks are used to share music, movies, and software files among its users. To access this network a user installs a Peer-to-Peer client software application that is capable of connecting to, and utilizing the Peer-to-Peer network. When installing the software the user must select a folder on their computer system in which to store any downloaded files. Any files placed into this folder are also made available to other users. For instance, if user #1 places a file named "foofile" in their shared folder, user #2 would then be able to access and download the file.

For whatever reason, users sometimes select a folder as the shared folder that contains sensitive information or information they do not otherwise wish to share or they may later begin to place sensitive information or information they do not otherwise wish to share into their shared folder by mistake. Usually this action is done by mistake and unknowingly by the user but sometimes it is done by a malicious person. Sometimes the Peer-to-Peer client software has a software bug that permits the sharing of files and directories that the user never intended to be shared. Sometimes it is a violation of corporate policy to have Peer-to-Peer client software installed.

The information shared may be detrimental the user, the company they work for, or even to national security. For instance, an employee of company "A" may inadvertently be sharing confidential information on company "B." It would therefore be advantageous to locate these people who are sharing sensitive or protected information so that the information can be removed or the person can be made to stop sharing the information.

Accordingly it is an object of the present invention to provide a method for locating specific types of people or specific information on Peer-to-Peer networks by issuing specific search terms that would result in locating and identifying information that should not be shared.

SUMMARY OF THE INVENTION

Generally, the present invention provides a system for locating specific types of people or specific types of information by issuing specific search terms known to result in a response from a specific type of person or a response by someone with a specific type of information. The preferred system comprises:
 a. a storage medium for storing instructions;
 b. a user input device for receiving user input; and
 c. a processor unit operable to process the user input and to use the instructions to execute a program to:
  i. connect to the Peer-to-Peer network; and
  ii. issue a search for a specific term or specific group of terms for a specific type of person or a specific type of information.

The present invention also provides a method for locating specific types of people or specific types of information.

Generally, the present invention provides a method for monitoring search requests for selected objects by a node on a peer to peer network having at least two nodes and providing a response to substantially all of such requesting nodes. The preferred method comprises the steps of
 a. interposing at least one pseudonode on a peer to peer network, where the pseudonode configured to provide at least one IP address and, optionally, at least one network address wherein the pseudonode includes at least one selected object stored there at;
 b. searching said network through at least one of said pseudonode to detect requests matching said at least one of said stored objects;
 c. acquiring a unique ID generated by any network node requesting said object matching said stored object; and
 d. responding to substantially each node representing an ID.

Thus, the present invention provides a method for monitoring peer to peer networks using at least one pseudonode to receive search requests and to respond to such requests by providing information to at least one or more requesting nodes on such network. The invention does not require that all such responsive information be identical to the information requested. In one such embodiment the method of the present invention provides for a pseudonode that is configured to change its IP address as well as its client ID in a random or preselected manner.

In another embodiment of the invention a method for monitoring a peer to peer network comprises at least one pseudonode configured to reduce data transmission and retrieval on such networks by interposing searches so as to prevent unauthorized connective actions with other nodes on the network. The method provides for a pseudonode that comprises of nodes that respond to searches with incorrect or incapacitating information and which also remove search requests from the network so that other non-pseudonodes will not respond.

This invention also provides a method wherein at least one pseudonode reviews each search request on the network against a preselected criteria of information or actions. If a search matches preselected criteria, then the pseudonode will limit the transmission and retrieval of the selected data by responding with incorrect or incapacitating information. The pseudonode in one preferred embodiment responds to search requests and returns incorrect data so that the successful retrieval of the data is diminished. In another embodiment of the invention the pseudonode is configured to "confuse" the network node originating a search by one or more of the methods outlined below. These methods are also useful in peer to peer networks where specific nodes cache file information by configuring the pseudonode to specifically address the caching nodes in the network.

These methods include:
1. Sending a response that it has the data, such data not being the requested information, but different data or not having any data at all.
2. Sending a response by impersonating a node on the network.
3. Sending a response by impersonating multiple nodes such that the data appears to be available from multiple network nodes rather than the pseudonodes.
4. Sending a response that causes the originator of the search to cease to function or severely limit its operation.
5. Sending a response that lists random file names or file sizes available from single or multiple nodes on the network.
6. Sending a response back that fills the node's display window with irrelevant information.

To appear as a node on the network, the pseudonode uses its configured list of addresses or an address generated at random by the pseudonode. These addresses may or may not exist on the peer to peer network. However, if these addresses do not exist on the network the pseudonode will make it appear as though they do.

Another method is to eliminate searches from the network. The pseudonode is configured to represent itself on a proxy based network as a network node, for example, by the method described above. As network nodes issue search requests that pass through the pseudonode it compares each search request to a set of preselected criteria or criteria that is based on an expert system or fuzzy logic. If a match is made with this criteria, the pseudonode drops the search request. The leaf node and main nodes receive no data concerning the drop and thus act as though no searches matched criteria.

Finally, most nodes on a peer to peer network can only support a defined maximum number of connecting nodes. In such case a pseudonode of the present invention is configured to appear in the network as multiple nodes that make multiple connections with network nodes. These multiple connections reduce and limit the network nodes' ability to accept connections from other network nodes.

In another embodiment of the invention, a pseudonode is configured to connect with multiple network nodes. This method is particularity useful in extremely large networks that contain a large number of nodes. In addition, multiple pseudonodes can be configured to connect with different network nodes to increase the opportunity of receiving search requests for selected criteria. These multiple pseudonodes can be located at one physical location or at many different physical locations to increase the chance of receiving search of preselected criteria. In the case of multiple pseudonodes, it is preferable to configure such pseudonodes to share a common list of connected network nodes such that each pseudonode is configured to manage connections that are not to the same network nodes. Alternatively or in connection therewith, the multiple-pseudonodes can also be configured to detect, store and manage the IP and network addresses of the network nodes for the multiple pseudonodes.

In another embodiment one, or a plurality of, pseudonode compares searches to the preselected criteria and passes to a second pseudonode the address of a network node that has initiated a search. The second pseudonode is configured to send information to the network node that initiated the search. The information that is sent, in the case of searches for unauthorized materials, may be incorrect or incapacitating. The first pseudonode, in either case, drops the search from the network so that other network nodes do not respond.

In all of the embodiments, the pseudonode is configured to have one or more of the features set forth below. These features are employed in the methods of monitoring peer to peer networks to provide enhanced search and response capabilities compared to the network nodes in the particular network being addressed. Thus, not all of the capabilities need to be programmed into each pseudonode in order to monitor and respond in the network. The presently preferred configurations include:

The pseudonode is configured to connect to a large number of network nodes.

Typically network nodes in peer to peer networks support 1-10 connections the pseudonode can configured according to the invention to support thousands.

The pseudonode is configured to change its peer to peer network reported IP address.

The pseudonode is configured to change its IP address on selected event occurrences.

The pseudonode is configured to change its client ID on selected event occurrences.

The pseudonode is configured to change its GUID on selected event occurrences.

The pseudonode is configured to generate multiple search responses that contain randomized file names and file sizes from randomized network nodes.

The pseudonode is configured to generate search responses that contain the same file with different file sizes so as to diminish the ability of network nodes to sort them for the user.

The pseudonode is configured to impersonate multiple network nodes.

Other advantages of the present invention will become apparent from a perusal of the following detailed description of presently preferred embodiments of the invention.

DESCRIPTION OF PRESENTLY PREFERRED EMBODIMENTS

Figure 1:
FIG. 1 is a simplified schematic of a two node peer to peer network.

The preferred system of the present invention advantageously utilizes specific terms or groups of terms to locate specific types of people or specific types of information.

In the preferred embodiment, the invention is embodied in a computer system that contains a processor unit, main memory, and an interconnect bus. The processor unit may contain a single microprocessor, or may contain a plurality of microprocessors for configuring the computer as a multi-processor system. The main memory stores, in part, instructions and data for execution by the processor unit. If the ability of the inventive system is wholly or partially implemented in software, the main memory stores the executable code when in operation. The main memory may include banks of dynamic random access memory as well as high speed memory.

The computer system may further include a mass storage device, peripheral devices, portable storage medium drives, input control device, a graphics subsystem, and an output display. The computer system may be connected through one or more data transport means. For example, the processor unit and the main memory may be connected via a local microprocessor bus, and the mass storage device, peripheral devices, portable storage medium drives, graphics subsystem may be connected via one or more input/output (I/O) busses. The mass storage device, which may be implemented with a magnetic disk drive or an optical disk drive, is nonvolatile storage device for storing data and instructions for use by the processor unit. In the software embodiment, the mass storage device stores the software for loading to the main memory.

The input control device(s) provide a portion of the user interface for a user of the computer system. The input control devices may include an alpha numeric keypad for inputting alphanumeric and other key information, a cursor control device, such as a mouse, a trackball, a stylus, or cursor direction keys. In order to display textual and graphical information, the computer system contains the graphics subsystem and the output display. The output display may include a cathode ray tube display or a liquid crystal display. The graphics subsystem receives textual and graphical information and processes the information for output to the output display.

The components contained in the computer system are those typically found in general purpose computer systems, and in fact, these components are intended to represent a broad category of such computer components that are well known in the art.

The system may be implemented in either hardware or software. For the software embodiment, the software that includes a plurality of computer executable instructions for implementation on a general purpose computer system. Prior to loading into a general purpose computer system, the system may reside as encoded information on a computer readable medium, such as a magnetic floppy disc, magnetic tape compact disc read only memory (CD-ROM). In one hardware embodiment, the system may comprise a dedicated processor including processor instructions for performing the functions described herein. Circuits may also be developed to perform the functions described herein.

In one preferred embodiment of the present invention, issuing a search for the term MBNA®, dispute, statement, bank, Citibank®, American Express®, Bankone®, card services, Chase®, checking, debit, deposit, First USA®, loan, payment, savings, or transaction will result in locating people and/or information related to financial accounts.

In another embodiment of the present invention, issuing a search for the term dispute, cover letter, resume, creditcard, mbna, or Citibank will result in locating people and/or information related to identify theft and credit card disputes.

In another embodiment of the present invention, issuing a search for the term stock, broker, Merrill®, Smith Barney®, Ameritrade®, Datek®, Scot Trade®, Charles Schwab®, dividend, J.P. Morgan®, or TD Waterhouse® will result in locating people and/or information related to investment accounts.

In another embodiment of the present invention, issuing a search for the term chairman, board of directors, CFO, CEO, CTO, COO, CXO, or board meeting will result in locating people and/or information related to corporate executives or corporate operations.

In another embodiment of the present invention, issuing a search for the term budget or audit will result in locating people and/or information related to corporate financials.

In another embodiment of the present invention, issuing a search for the term board meeting, chairman, confidential, contact list, client list, contract, agreement, FYI05, FYI04, FYI06, FYI07 (and so on), agmt, agreement, executive, or budget will result in locating people and/or information related to miscellaneous corporate operations.

In another embodiment of the present invention, issuing a search for the term contact list, client list, forecast, NDA, SOW, proposal, RFQ, RFP, or RFI will result in locating people and/or information related to sales.

In another embodiment of the present invention, issuing a search for the term Deposition, disclosure, NDA, mutual, or Confidentiality will result in locating people and/or information related to legal matters.

In another embodiment of the present invention, issuing a search for the term DSC will result in locating people and/or information related to pictures.

In another embodiment of the present invention, issuing a search for the term SF85P or EPSQ will result in locating people and/or information related to security clearances.

In another embodiment of the present invention, issuing a search for the term response plan, emergency plan, preparedness, DHS, homeland security, coast guard, DHHS, smallpox, or emergency will result in locating people and/or information related to homeland security.

In another embodiment of the present invention, issuing a search for the term USCG, DHS, Homeland Security, USSS, FBI, or CIA will result in locating people and/or information related to protection agencies or investigation units.

In another embodiment of the present invention, issuing a search for the term r@ygold, boylover, childlover, pedo, pedofile, pedophile, Pedophilia, kiddy, Lolita, prelolitas, b@rebone, or ddoggprn will result in locating people and/or information related to child pornography.

In another embodiment of the present invention, issuing a search for the term Incident or investigation will result in locating people and/or information related to investigations.

In another embodiment of the present invention, issuing a search for the term phrack, 2600, credit cards, hacker, hack, anarchist cookbook, or credit will result in locating people and/or information related to hackers.

In another embodiment of the present invention, issuing a search for the term aetc, afcc, afic, aflc, afmc, afres, afspc, afsoc, afsc, apgc, hqc, pacaf, or usafe will result in locating people and/or information related to Air Force commands.

In another embodiment of the present invention, issuing a search for the term usareur, forscom, tradoc, usace, medcom, usarpac, smdc, usasoc, or mtmc will result in locating people and/or information related to Army commands.

In another embodiment of the present invention, issuing a search for the term SOP, OPORD or annex will result in locating people and/or information related to military cadets.

In another embodiment of the present invention, issuing a search for the term northcom, usnorthcom, uscentcom, centcom, useucom, eucom, uspacom, pacom, ussouthcom, or southcom will result in locating people and/or information related to major military commands.

In another embodiment of the present invention, issuing a search for the term Accenture®, Booz Allen®, Lockheed®, Boeing®, Raytheon®, General Dynamics®, Litton®, GTE®, Textron®, Humana®, DynCorp®, Sverdrup®, Halliburton®, Aersospace, Unisys®, Worldcorp®, Mitretek®, Ssanyong®, Teledyne®, or Sabreliner® will result in locating people and/or information related to military government contractors.

In another embodiment of the present invention, issuing a search for the term CONOPS will result in locating people and/or information related to design concepts.

In another embodiment of the present invention, issuing a search for the term barracks, battalion, brigade, division, or regiment will result in locating people and/or information related to military units.

In another embodiment of the present invention, issuing a search for the term intsum, inscom, C4isr, c4i, c4isp, c4i-sp, c4i-sr, c4i-ta, c3i will result in locating people and/or information related to intelligence.

In another embodiment of the present invention, issuing a search for the term spawar, navsoc, cnrse, USFLTFORCOM, comUSFLTFORCOM, COMUSNAVEUR, USNAVEUR, airlant, airpac, surflant, surfor, ussurfor, comnavsurflant, navsurflant, secondfleet, c3f, cusns, cmwc, COMINEWARCOM, MINEWARCOM, ewtglant, or cffc will result in locating people and/or information related to Naval commands.

In another embodiment of the present invention, issuing a search for the term frago, bolo, sitrep, intsum, SPOD, RSOI, conop, warno, opord, fragord, warnord, oplan, or MDMP will result in locating people and/or information related to military operations.

In another embodiment of the present invention, issuing a search for the term that are numbers with a suffix of "th", "rd", and "nd" will result in locating people and/or information related to military units.

In another embodiment of the present invention, issuing a search for the term improvised, PETN, explosives, FM, cyanide, Islamic, jihad, Koran, mujahid, mujahideen, muslim, ricin, underground storage, advanced language patterns, dead sea scrolls, department homeland security, white power, nitrite, nitrate, military, sniper training, poison, silencer, or anarchists will result in locating people and/or information related to terrorists.

In another embodiment of the present invention, issuing a search for the term Koran, Dead Sea Scrolls, Muslim, Islamic, or Islam will result in locating people and/or information related to muslim culture.

EXAMPLES

The following Example illustrates an embodiment of the system according to the present Invention.

Example 1

This example illustrates a system for locating information relating to military operations.

Military operation change orders are called frago's. In this example user #1 wishes to locate military personnel. User #1 connects to the Peer-to-Peer network and issues a search for the term "frago." User #2 is in the military and has a file named "frago-opord1.doc." User #2 responds to User #1 that he possesses a file that matches the term "frago" and makes the file available for User #1 to download. User #1 has located military information being shared by military personnel.

With reference to FIGS. 1 through 4, the preferred methods of the present invention advantageously utilize at least one pseudonode. The pseudonode can take on the appearance of or be any node shown in FIGS. 1 through 4, and has certain preferred attributes. These attributes are configured for the specific type of monitoring of peer to peer search requests and response desired by the end user. In monitoring peer to peer networks for the search and transfer of files that are authorized by the owners thereof, the pseudonode is preferably configured to change its reported peer to peer network IP address. It also is preferably configured to change its IP address on selected event occurrences and to change its client ID. In certain tasks, it is preferably configured to change its GUID for selected event occurrences.

In one preferred embodiment of the present invention, a pseudonode comprises both a hardware system such as a computer, thin appliance, ASIC based device or other similar device, which can be programmed with specific logic or programming code (i.e. software). In the preferred embodiments, the device preferably has the capability of being connected with a physical network either directly or though the use of a gateway. The programming logic provides the device with the capability to transmit and receive on both physical networks as well as the peer to peer networks which typically ride on top of a physical network. In the preferred embodiment of the invention programming logic is a software program but may also be hard coded non-changeable procedural information such as typically found on an ASIC based device.

Figure 9A:
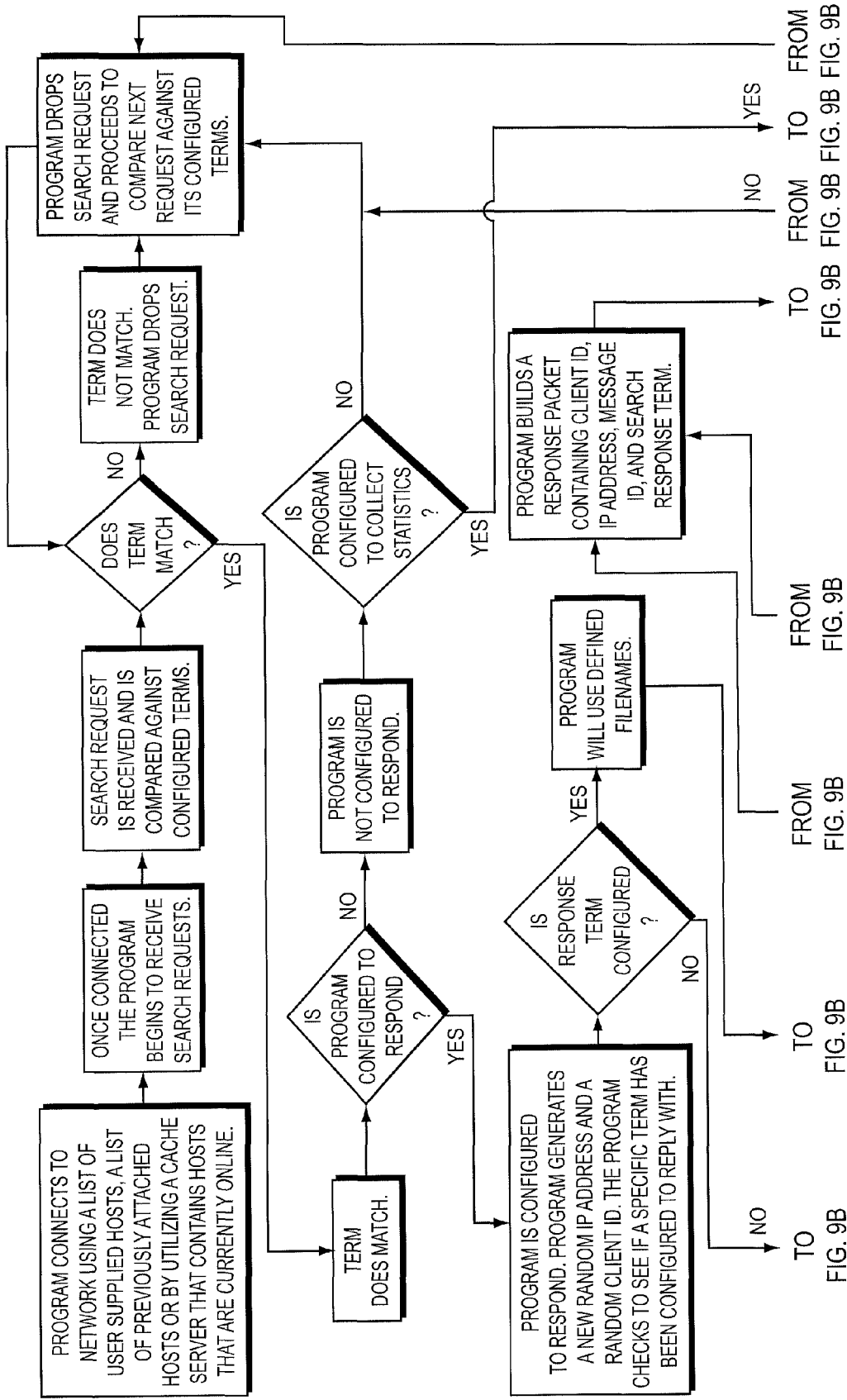
FIG. 9 is a flow chart representation of the programming or configuring a pseudonode to execute certain preferred methods of the present invention.
Figure 9B:
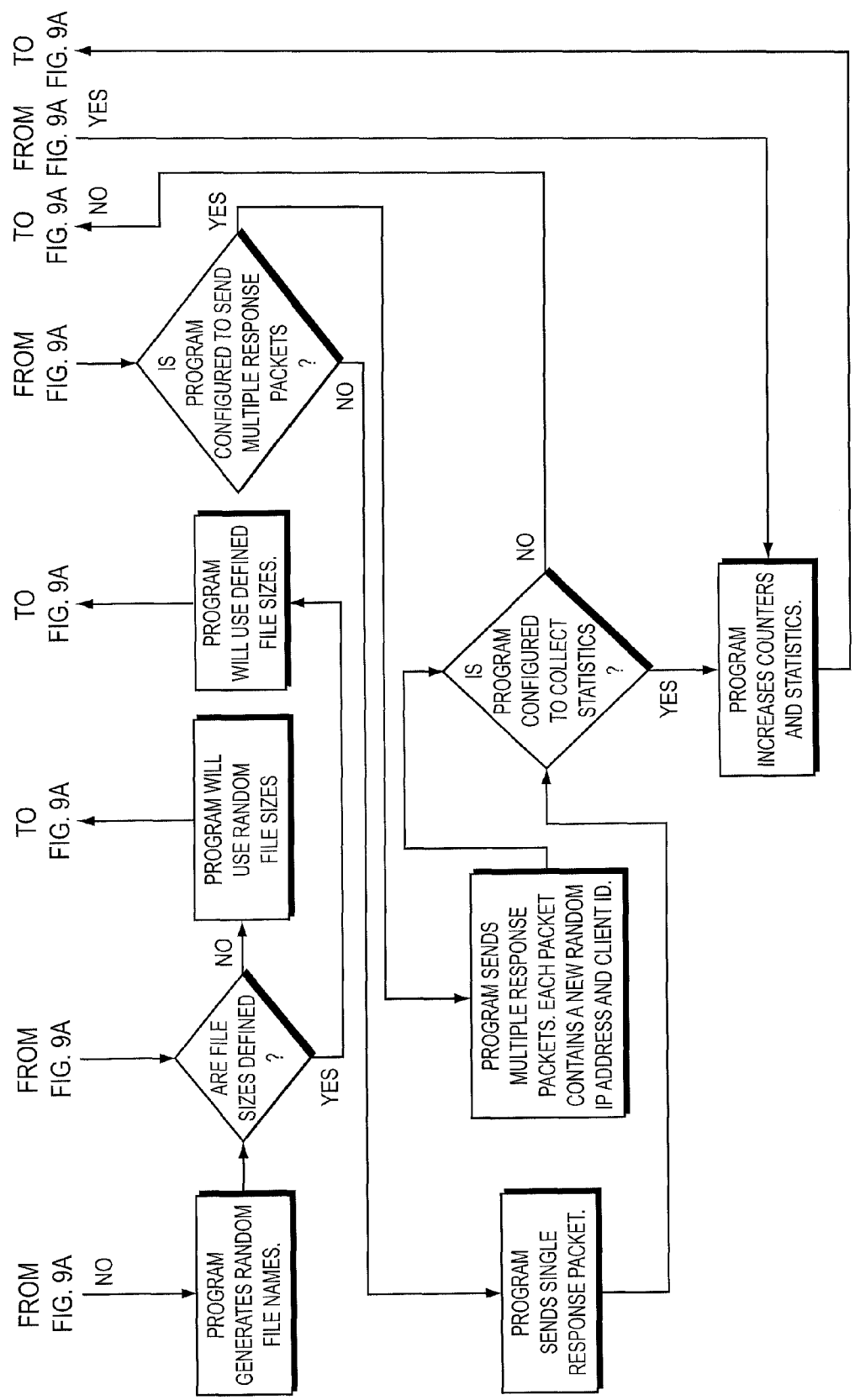

Referring generally to FIG. 9, a flow chart discloses one method for the programming logic that configures a device acting as pseudonode to attach to a peer to peer network. This pseudonode accepts search requests and responses from nodes participating on the network. These nodes can originate search requests or responses or they can forward a search or response as part of their participating in the network.

The programming logic is configured to receive search requests and responses and compare them to a list of items that have been entered into it by the user and to then perform some event whether or not a match is found. The programming logic may elect to drop the search request or response and not pass it on to other nodes. This election can be automatic depending on trigger points such as load or it can be configured to do so by the user of the programming logic.

The method for comparing may include inter string, complete string, partial string, fuzzy logic, patricia tree or any other method that could be used to compare the likeness of two or more strings or portions of two or more strings. String comparison can occur in parallel with other searches to increase throughput or they can be compared serially (meaning one after another). If a match is made, the programming logic can build a response to the search request if it is programmed to do so. This search response contains the IP address of the pseudonode and the peer to peer client ID of the programming logic. Because peer to peer networks utilize path routing as opposed to address routing, and because client addresses are not managed by a central authority but rather chosen at random, the response can be built to include any IP address and any client ID address that the programming logic selects, whether or not it exists.

There are no requirements for which files or file sizes are reported in the response. Thus the programming logic can be configured to return random file names or file sizes or specific file names and file sizes. The programming logic can also be configured to send the same search request out onto the network and reply back to the original searcher with the filenames and file sizes that are returned to it. The programming logic can also be configured to merely forward on the original search request and when replies are received it will replace the IP address and client ID with random values and forward it back to the original searcher. The programming logic can be configured to send many search responses each with a different IP address and client ID to make it appear that multiple nodes have the information.

Peer to Peer networks utilize path routing as opposed to address routing. With path routing each search request is tagged with a unique ID that is generated when the search request is created. As the search request is passed from one node to the next, each node records which path the search request was received on. At that point forward, if a node receives a search request with the same message ID from another path it will drop the search request. It does this to prevent duplicate search requests caused by loops in the network. Using this path routing method enables search responses to travel back the same path that the search request took. The programming logic can be configured to accept a search request from a node and pass the search request on to other nodes. When these other nodes respond back with response messages, the programming logic can be configured to drop the response. This prevents the original node that initiated the search from receiving results in two ways. First, because the pseudonode dropped the response, the searching node will not receive these responses. Secondly, other nodes will not respond to the original searching node if they would receive the message from other paths because they have already seen the message ID and would have dropped the search request as a duplicate. The pseudonode can also be configured to accept a search request from a node and replace the search string with a random set of numbers and characters but keep the same message ID. It would then forward the message on to other nodes. This prevents the original node that initiated the search from receiving results because no matches will have occurred to generate responses. Furthermore any nodes that received the search request with the correct search term will not respond because they would have already seen the same message ID and would drop this message as a duplicate.

The programming logic can also be configured to look for certain search terms and respond back with a file that contains information that informs the user they are violating copyright laws. This information may be an audio or visual message such as a recording in an audio file or a message in a document file. The filename may also be a message, for instance, "Warning_you_are_violating_copyright_laws.txt."

Nodes on peer to peer networks can be asked to send a file to other nodes. This is called "Pushing" the file and is usually used when nodes are behind firewalls. As described below, the present invention utilizes this feature of peer to peer networks to obtain a node's identity. Thus, when a node is firewalled, connections can not be made to it, thus if it is sharing files no nodes will be able to retrieve them. "Pushing" solves this problem by asking the node that is firewalled to make an outbound connection which usually is not protected. Any client can initiate a push request. The only information required is the client ID of the node that will push the file and the file index number of the file that is being requested. The push request contains this information as well as the TCP/IP address and port of the node that is requesting the push. When a node receives a push request it compares the client ID in the message with its own. If it matches, it then looks to see if it has the file index number that is referenced. If it exists the node attempts to connect to the requesting node over TCP/IP using the IP address in the request. Once connected the node sends a header that comprises of its client ID, the file index number and the file name. The requesting node will then proceed to have the file uploaded to it.

The programming logic can be configured to utilize this "Push" method to obtain the IP address of most nodes. The programming logic would be programmed with the other nodes client ID and a file index number. The programming logic would then issue the push request on the network. The node in the push request would receive the message and attempt to push this file to the pseudonode. The node's real IP address will be exposed once an out of band connection over TCP/IP is made between the node and the programming logic. The node will then send its client ID, file index number, and file name. The programming logic will store this information and disconnect the connection before the file is transferred. At this point the programming logic has a list of the correct IP address to client ID correlation.

This method also can be used to obtain a list of files on a node. On peer to peer networks files are only found by keyword searching. There is no way to ask a specific node for a list of files. Using the method above the programming logic would be configured with the client ID of a node and a file index of "1." It would issue the request to the node and when the node connects to the pseudonode and sends the header information it will record in a table the filename and client ID. It will then drop the connection before the file is transferred. The programming logic will then increment the file index number to a "2" and repeat the procedure. It will then record the information for file index 2. The programming logic will continue to increase the file index number and repeat the process until the node no longer responds.

It is known that certain ranges of IP addresses usually cover certain geographical ranges, such as a city or town. Authorities can use this file listing feature along with IP ranges of known terrorist states to review and search for terrorist activity by looking at what files are available on these nodes and by downloading them and reviewing them. Companies may also use this feature to look for copyrighted information on a specific computer. Companies may also use the information gathered for use in statistics or to build user profiles based on what they've downloaded or are sharing.

The programming logic can be configured to keep track of searches and searches that have matched certain criteria. The programming logic can be configured to accept numbers that are used against these statistics to calculate dollar amounts such as business losses. For instance the programming logic can be configured to keep track of the search term "mp3" and multiply it by "15" and present this number to the user as a business loss. These numbers can also be recorded for "Before and after" comparisons.

The programming logic can be configured to look for searches that contain specific terms and therefore can be used to detect if any user on the network is searching for them and if anyone is responding. This would be useful for a software company to find out if their software is being pirated, how much, and by whom.

The programming logic has the ability to store in a table client IDs and IP addresses by looking at search responses and stripping off the client ID. With the client ID it can then build a push packet to be used to detect the IP address of the node and this information can be stored in a file. This information can be used to generate statistics on the growth and size of the network. It should be noted that in many of the monitoring applications of the invention it is not necessary to have a list of preselected data objects to search against. It is possible to monitor to all search requests and record those for reporting or statistical functions.

The programming logic can be configured to record both search requests and their responses. This information can be written to a file which can later be used in a court of law or for other purposes which require documentation.

The programming logic can be configured to record attribute information received from a node. For instance the programming logic may send out a search request for "mp3" and then record information such as the IP addresses or the client IDs of those nodes that respond.

In one embodiment of the invention, it is desirable to convert pseudo IP addresses of peer to peer nodes into real ones. Peer to peer networks are often session level networks that ride on top of the Internet. Nodes on peer to peer networks have network numbers that are not managed by any authority and because of this unauthorized recipients of information and files are hard to locate. (The internet is comprised of nodes, each with specific addresses that are managed by the ARIN (American Registry for Internet Numbers) authority making it relatively easy to find out who is responsible for a specific computer on the Internet.) While nodes on the peer to peer network do have true network IP addresses so that they can communicate with their direct neighbors they do not have to transmit valid IP addresses in their peer to peer network messages.

Figure 5:
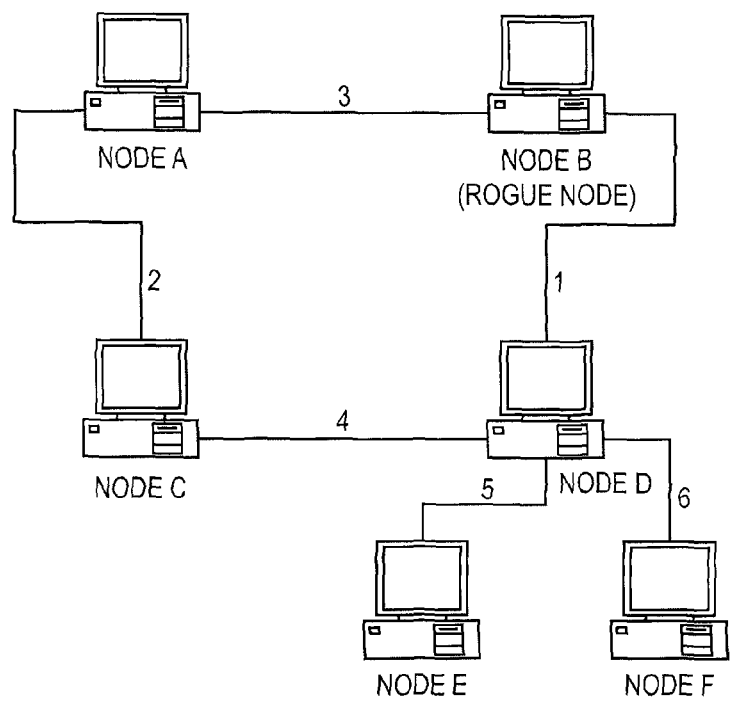
FIGS. 5 and 6 are schematic representations of a network wherein node N is a pseudonode used in the just seen method of the present invention to defeat search requests.
Figure 6:
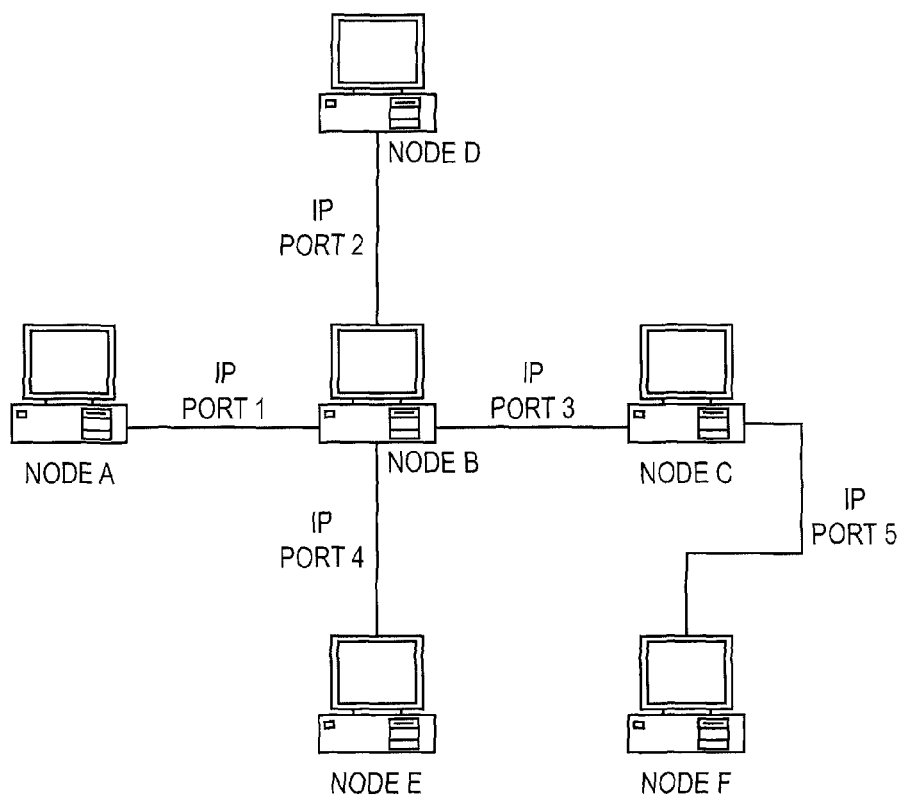

Referring generally to FIGS. 5 and 6, peer to peer networks utilize message ID/path routing so they do not need to transmit valid IP addresses to function. Every message that is sent on a peer to peer network has a unique message ID assigned to it. This message ID is a unique 16 byte number and is generated when each new message is created. As peer to peer nodes receive messages, they record which IP port it was received on along with the message ID so that if there is a response they will know how to route it back.

Using the network depicted in FIG. 6, if Node A attempts to acquire the file "Yellowstone.txt" it generates a search request with a message ID of "abcdefg" with the search term of "Yellowstone.txt" and forwards the request to node B. Node B records that it received a message with an ID, for example, "abcdefg" on port 1. Node B then forwards the search request to Nodes C, D, and E. Node C records that it received a message with an ID "abcdefg" on port 3. Node D records that it received a message with an ID "abcdefg" on port 2. Node E records that it received a message with an ID "abcdefg" on port 4. Node C forwards the search request to Node F. Node F records that it received a message with an ID "abcdefg" on port 5, for example. All nodes search their local files and only Node F has a match. Node F will look up the message ID "abcdefg" in its tables and see that it received it on port 5. It will generate a response message that comprises of its IP addresses, a file index and its peer to peer network address. It will then send a response out port 5. Node C will receive the response message and look in its tables for message ID "abcdefg" and see that it was received on port 3. It will then forward the response out port 3. Node B will receive the response message and look in its tables for message ID "abcdefg" and see that it was received on port 1. It will then send a response out port 1 but not out ports 2 & 4. Node A will receive the response and look in its tables for message ID "abcdefg" and find that it initiated the search and will then process the packet.

As well known, peer to peer network nodes allow a user to enter in any IP address they wish to identify themselves. This IP address is encapsulated in the response message along with a peer to peer client ID that is a unique 16 digit number. This client ID is randomly generated but the node does not change it until it is restarted. The IP address that is encapsulated in the response is used by the searching node to contact the node with the file out of band (out of network). On peer to peer networks search and control communications occur on the peer to peer network but file transfers occur at the Internet or true network level. Without a correct IP address the node looking for the file would not be able to retrieve the file. Many nodes on the peer to peer network randomize their IP address to avoid disclosing their identity. Without the knowledge of what a node's true IP address is, anyone searching for the node would not be able to locate its true identity. It is therefore beneficial if a pseudo IP addresses can be converted to a true IP address.

The present invention provides for a method to locate the true IP address of the node by utilizing the method that peer to peer networks use to evade firewalls. In a peer to peer network if the requesting node can not contact the node who holds the file, the requesting node can issue a "Push" request to the node that holds the file. This is done by sending a specialized message to the client ID that was encapsulated in the original search response message. This push request triggers the node that contains the file to connect to the requesting node and upload the file. Once the node that contains the file connects to the requesting client, its true IP address is exposed and can be captured.

Figure 7:
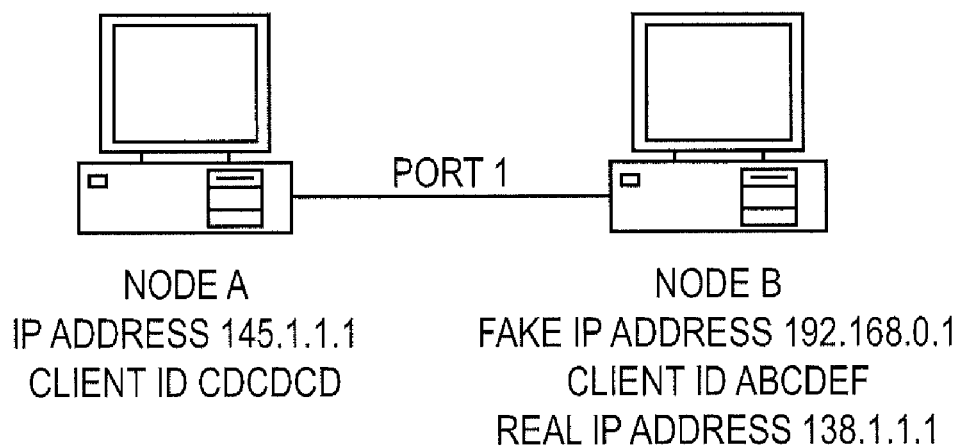
FIG. 7 is a simplified schematic for use in illustration of locating a node's true IP address.

With reference to FIG. 7, Node A is a pseudonode that issues a search request to Node B with a message ID of "123456" for the file "Madonna.mp3." Node B records that it received a search request with a message ID of "123456" on port 1. It searches its list of files and locates "Madonna.mp3". It sends a search response message to Node A that contains the filename, file index, its pseudo IP address of "192.168.0.1" and its client ID of "ABCDEF". Node A receives the search response and records the client ID of node B in a table. It then creates a push request for client ID "ABCDEF" for the file index that was returned. It then sends this push request to Node B. Node B receives the response and finds that it is a push request for itself Node B connects to Node A out of band over the transport network (i.e. the Internet). Node A accepts the connection. Once connected Node A now has the true IP address of Node B because for Node B to communicate with Node A out of band Node B must expose its true IP address. Node B then sends a message that contains its client ID, the file name, and the file index of "Madonna.mp3." Node A looks in its tables for the client ID, finds that it has sent a push request and records the true IP address. It then drops the connection without receiving the file. Node A now has the IP address and client ID of Node B.

It is important to be able to identify all files that a network node is sharing in a peer to peer network. Currently on peer to peer networks the only way to locate files is by keyword searching and therefore unless the searcher knows what files a node is sharing they can not see all of the files that are available. If a node on the network is sharing unauthorized files, such as a copyrighted movie or song, it is desirable to see any other unauthorized files the node may be sharing. This invention provides a method for viewing all files that a specific node is sharing by creating multiple "Push" requests and recording their responses.

The "Push Request" functionality was engineered into peer to peer networks to get around nodes that were firewalled. In a peer to peer network, nodes query for files using the peer to peer network but retrieve files from other nodes by directly connecting to them and requesting the file. If the node that contains the file is firewalled then no connections are able to be established with it. To get around this problem, engineers of the peer to peer networks devised a way that a specialized packet can be sent through the peer to peer network to the firewalled peer to peer node requesting that it "Push" (upload) the file to the requesting node. Because the firewalled node is allowed to make outbound connections through its firewall, it can successfully transfer the file to the requesting node as long as the requesting node is itself not firewalled. The push request contains four key fields. The first is the peer to peer client ID of the node that holds the file. The second is a file index number. The file index number is a numerical representation of the file being shared. When a node first starts up, it indexes its files that are available, starting with 1. For example:

file1.txt file index 1
file2.txt file index 2
file3.txt file index 3
file4.txt file index 4

The third field is the IP address of the requesting node. The fourth field is the TCP/IP port number of the requesting node.

Once the requesting node builds the push request it transmits it to the network. Each node on the network looks at the message and if the client ID is its own it will process it. (see FIG. 8) If a node finds that it is being requested to push a file and if the file index exists on the node, it will attempt to connect out of band to the requesting node. Once connected, it will transmit a header that contains its client ID, the file index and the name of the file. It will then attempt to send the file. Because the node sends the file name in the header there exists a method to locate all files that the node is sharing by sending multiple push requests that request different file indexes. Preferably the push request would start at a file index of "1" and continue on incrementally (i.e. "2", "3", "4") and stop when the other node no longer responds with file names.

Figure 8:
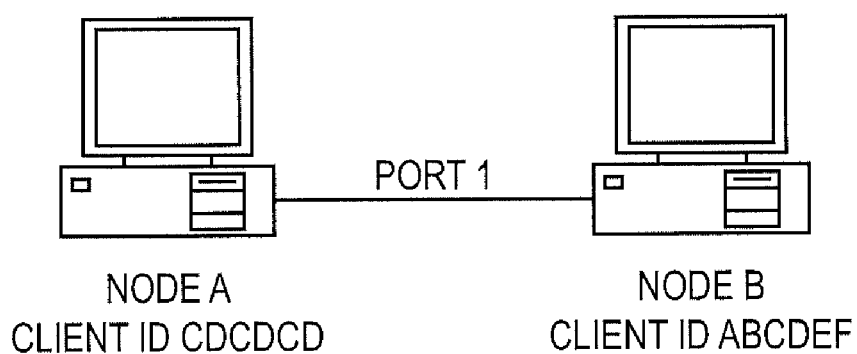
FIG. 8 is a simplified schematic for use in illustration of locating all files that a node is sharing or has downloaded.

In FIG. 8 Node A is a pseudonode wishing to get a list of all files that Node B is sharing. Node A builds a push request that contains its IP address, its TCP/IP port, the client ID of Node B (ABCDEF) and the file index of "1." Node A then sends this request to Node B. Node B realizes that the client ID is itself so it processes the request. It looks up file ID "1" and finds that it is "madonna1.mp3". It attempts to contact Node A out of band through the IP address and port that was in the push request. Node B connects to Node A and sends a header which contains its client ID, the file index "1" and the file name of "madonna1.mp3." Node A then disconnects before Node B can transfer the file. Node A then repeats the same steps over except this time, it sends a push request with a file index of "2" to Node B. Node B receives the push request and realizes that it is for itself so it processes the request. It finds that file index "2" is for "sting1.mp3". Node B connects to Node A out of band through the IP address and port that was in the push request. It then sends a header which contains its client ID, the file index "2" and the filename of "sting1.mp3." This procedure occurs over and over again and each time Node A increments the file index number. Once Node B stops responding to Node A, Node A will realize that Node B is not sharing any further files.

Example 1

This example illustrates a method for responding to a request on a peer to peer network. Referring to FIG. 1, Node B is acting as a pseudonode and is configured to respond to any node issuing a search request for a file named "X."

When Node A issues a search request on the network for a file named "X" Node B will detect this search and compare Node A's search string to its configured list of strings. Because Node A is searching for a file named "X" and Node B is configured to respond to searches for a file named "X", Node B will send back a response to Node A that it has the file named "X" when in reality it does not. When Node A attempts to retrieve the file from Node B an error condition will result because the file does not exist on Node B. This limits data transmission and retrieval in two ways. First, because other nodes may have responded to Node A the node will have to sort through all results choosing the correct file to retrieve. This increases the time it takes to successfully retrieve the file. Secondly, Node A's time and resources will be consumed if Node A attempts to retrieve the file from Node B because the file does not exist. This causes Node A confusion and frustration because of reoccurring failures.

Example 2

This example illustrates a method for responding to a request with data different from that requested. In this case Node B is acting as a pseudonode and is configured to respond to any node issuing a search request for a file named "X."

When Node A issues a search request on the network for a file named "X" Node B will detect this search and compare Node A's search string to its configured list of strings. Because Node A is searching for a file named "X" and Node B is configured to respond to searches for a file named "X" Node B will send back a response to Node A that it has the file named "X". When Node A attempts to retrieve the file from Node B, Node B will send a different file then what is expected. This file can be any file and its purpose is to make Node A believe that it is downloading the true file "X." This limits data transmission and retrieval in two ways. First, because other nodes may have responded to Node A it will have to sort through all results choosing the correct file to retrieve. This increases the time it takes to successfully retrieve the file. Secondly, Node A's time and resources will be consumed if Node A attempts to retrieve the file from Node B because the file is not the correct one. This causes Node A confusion and frustration because of reoccurring failures.

Example 3

This example illustrates the impersonation by a pseudonode of a network node. Thus, Node B acts as a pseudonode and is configured to respond to any node issuing a search request for a file named "X." When Node A issues a search request on the network for a file named "X" Node B will detect this search and compare Node A's search string to its configured list of strings. Because Node A is searching for a file named "X" and Node B is configured to respond to searches for a file named "X" Node B will send a response to Node A that Node C has the file named "X" when in reality Node C does not exist on the network. When Node A attempts to retrieve the file from Node C an error condition will result because Node C does not exist. This limits data transmission and retrieval in two ways. First, because other nodes may have responded to Node A it will have to sort through all results choosing the correct file to retrieve. This increases the time it takes to successfully retrieve the file. Secondly, Node A's time and resources will be consumed if Node A attempts to retrieve the file from Node C because Node C does not exist. This causes Node A confusion and frustration because of reoccurring failures.

Example 4

In this example, a pseudonode acts as multiple network nodes to make information appear to be available from multiple network nodes. In this case, Node B acts as a pseudonode and is configured to respond to any node issuing a search request for a file named "X."

When Node A issues a search request on the network for a file named "X" Node B will detect this search and compare Node A's search string to its configured list of strings. Because Node A is searching for a file named "X" and Node B is configured to respond to searches for a file named "X" Node B will send back multiple responses to Node A that multiple nodes have the file named "X" when in reality these nodes do not exist on the network. When Node A attempts to retrieve the file from any of these non-existent nodes an error condition will result because these nodes do not exist. This limits data transmission and retrieval in two ways. First, because other nodes may have responded to Node A it will have to sort through all results choosing the correct file to retrieve. This increases the time it takes to successfully retrieve the file. Secondly, Node A's time and resources will be consumed if Node A attempts to retrieve the file from non-existent nodes because the nodes do not exist. This confuses Node A and creates frustration because of reoccurring failures.

Example 5

This example illustrates a method for responding with a list of random file names or sizes from at least one network node. In this case Node B acts as a pseudonode and is configured to respond to any node issuing a search request for a file named "X."

When Node A issues a search request on the network for a file named "X" Node B will detect this search and compare Node A's search string to its configured list of strings. Because Node A is searching for a file named "X" and Node B is configured to respond to searches for a file named "X" Node B will send back responses to Node A that either a single node or multiple nodes have variations of the file named X. For example if the file was named "hopkins.txt" with a file size of 1,000 bytes Node B will send responses that Node C has a file named "hopki.txt" with a file size of 1,000 bytes even though Node C does not exist on the network. It may also add variations to the file size, for example changing the 1,000 bytes to some random number such as 2,002. These random file names and file sizes can be generated randomly or Node B can be configured with a list of names and sizes to reply with. For example Node B can be configured to reply with "hopki.txt" whenever a search for "hopkins.txt" is requested. When Node A attempts to retrieve the file from any of these non-existent nodes an error condition will result because these nodes do not exist. This limits data transmission and retrieval in two ways. First, because other nodes may have responded to Node A it will have to sort through all results choosing the correct file to retrieve. This increases the time it takes to successfully retrieve the file. Secondly, Node A's time and resources will be consumed if Node A attempts to retrieve the file from non-existent nodes because the nodes do not exist. This causes Node A confusion and frustration because of reoccurring failures.

Example 6

This example illustrates a response from a pseudonode that fills the requesting nodes display window with irrelevant data. In this case Node B is acting as a pseudonode and is configured to respond to any node issuing a search request for a file named "X."

When Node A issues a search request on the network for a file named "X" Node B will detect this search and compare Node A's search string to its configured list of strings. Because Node A is searching for a file named "X" and Node B is configured to respond to searches for a file named "X" Node B will send back enough responses to fill up node A's display window. These responses will contain information that multiple nodes have the file named "X" when in reality these nodes do not exist on the network. When Node A attempts to retrieve the file from any of these non-existent nodes an error condition will result because these nodes do not exist. This limits data transmission and retrieval in three ways. First, because other nodes may have responded to Node A it will have to sort through all results choosing the correct file to retrieve. This increases the time it takes to successfully retrieve the file. Secondly, Node A's time and resources will be consumed if Node A attempts to retrieve the file from non-existent nodes because the nodes do not exist. This causes Node A confusion and frustration because of reoccurring failures. Third, because the display window of Node A will be filled with invalid information further information from valid nodes will not be able to be displayed.

Example 7

Figure 2:
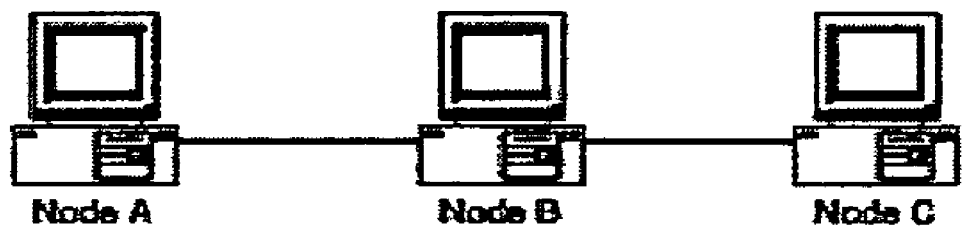
FIG. 2 is a simplified schematic of a peer to peer proxy network.
Figure 3:
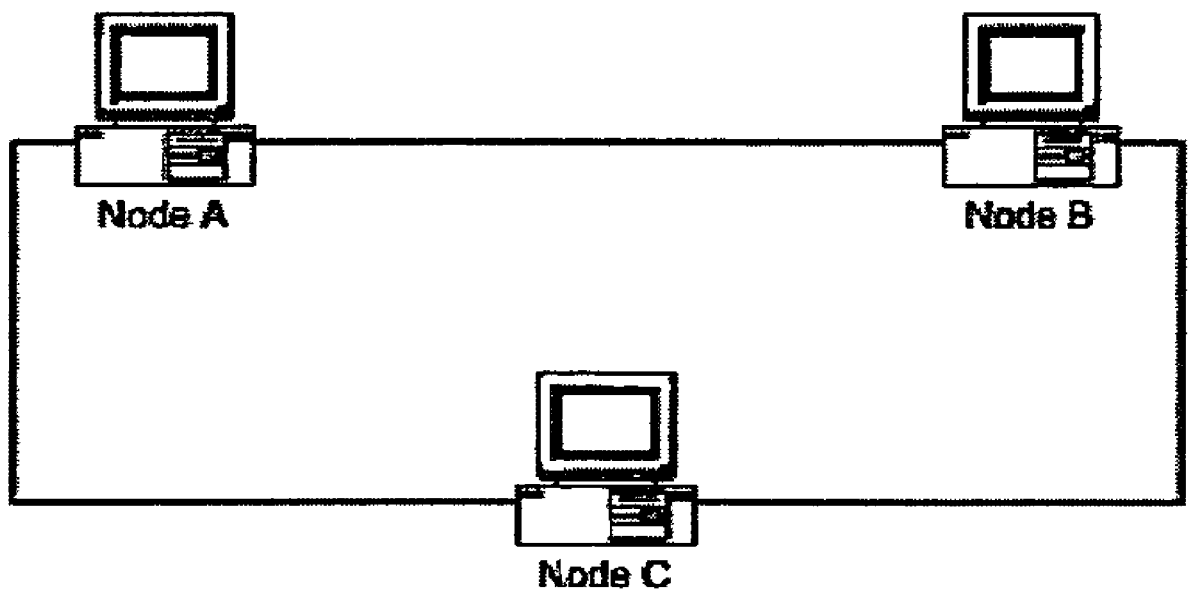
FIG. 3 is a simplified schematic view of a peer to peer, nonproxy, loop network.
Figure 4:
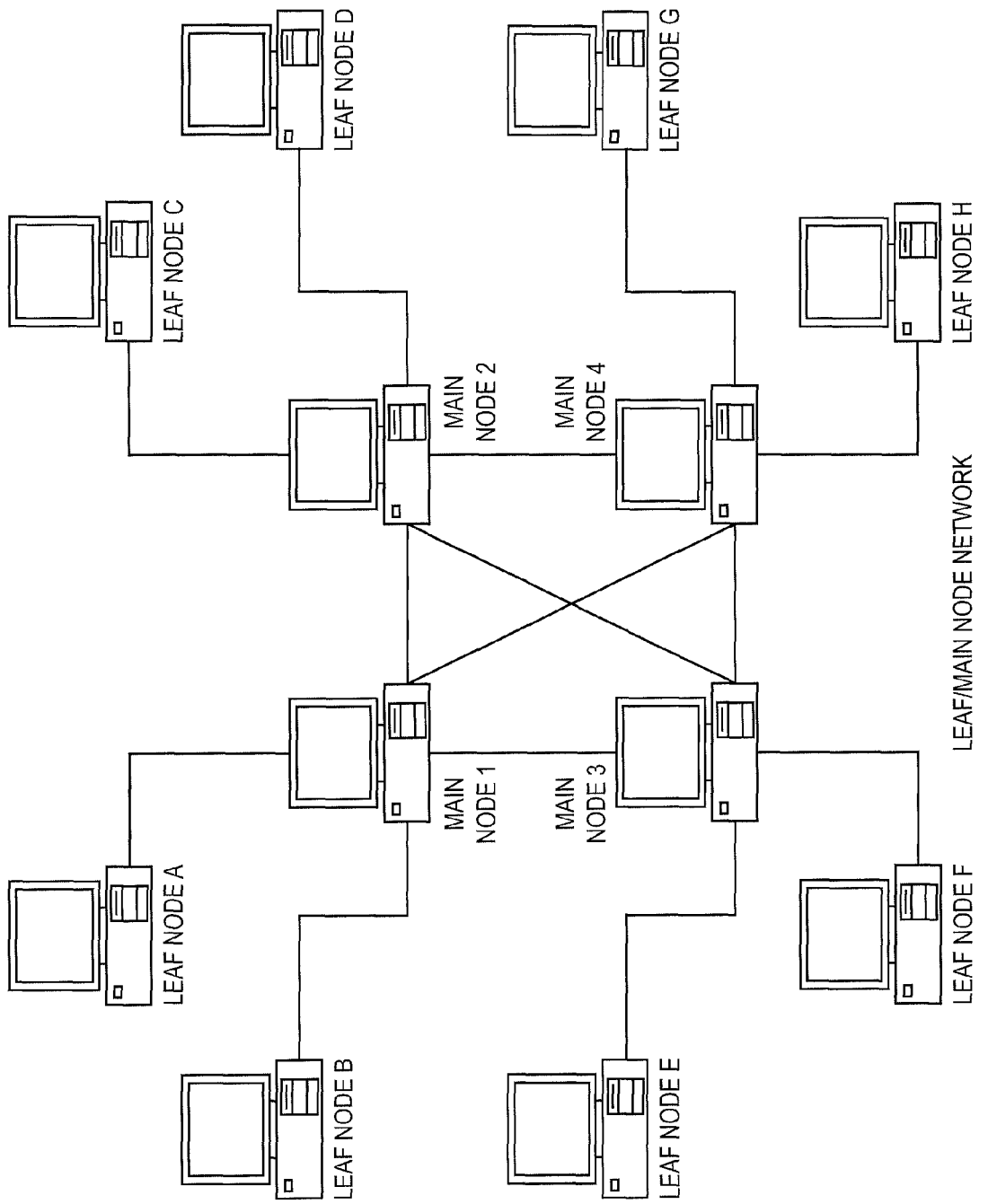
FIG. 4 is a simplified schematic of a peer to peer leaf/main node network.

Referring to FIG. 2, this example illustrates an embodiment for reducing or eliminating searches on a peer to peer network. In this case, Node B is acting as a pseudonode and a proxy. Node B is configured to drop any search requests for the file "X." This effectively removes searches for "X" from the network and prevents other nodes from responding with valid results.

When Node A issues a search request on the network for a file named "X" Node B will detect this search and compare Node A's search string to its configured list of strings. Because Node A is searching for a file named "X" and Node B is configured to drop searches for a file named "X" Node B will drop the search request and not forward it to Node C. Node A will assume that because it did not receive any search responses back that its search did not match any files on the network.

Example 8

Referring to FIG. 6, this example illustrates another embodiment for frustrating the unauthorized downloading of files over a peer to peer network. In this example, the method is applied to network having low bandwidth. In Example 9, a method is described for higher bandwidth networks.

In peer to peer networks, each search request that is sent out has a unique message ID associated with it. No other request will have the same message ID. When a node receives a search request it records which connection the search request came in on as well as the message ID. If the node should receive the same message ID from a different connection it will not respond to it or forward it, but will instead drop it. The node does this because in peer to peer networks it is possible to have a loop in the network as described in FIG. 3. If the node were to respond to both messages it would be in essence responding twice and which wastes bandwidth on the network. If a node that receives the request has files that match, it will send the results back through the connection that first received the message.

A method of search result reduction can be employed where a pseudonode of the present invention accepts the search packet from a node, strips the search term from the packet and replaces it with a randomized character string while keeping the same message ID. This modified packet is then sent onto the network. As network nodes receive the search request they will record the message ID and drop any future messages they may receive with the same message ID. Because the search term in the search request was replaced with a random character string it should not match any files on other network nodes. As a result these other nodes will not respond to the message ID of the real search term if they receive it from different routes.

Utilizing the above method and referring to FIG. 6, each node on the network except for node A has the file named "X" available. In this network node B is the pseudonode and is configured to utilize the just seen saturation method described above if it encounters a search for the file named "X."

In this example, Node A searches for file named X by issuing a request to its connected network nodes (node B and node C). This search request has a message ID of "abcd". Node C records that it received a search request from connection 2 with a message ID of "abcd". Because node B is configured to look for searches for file X and because node A sent it a request for file X, node B records that it received a message with an ID of "abcd" on connection 3, it will strip the search term off the message and replace it with a randomized character string and then send the request to node D. Node D records that it received a search with an ID of "abcd" from connection 1 and then forwards the search to nodes E, F and C. Because Node C has already seen a search request with an ID of "abcd" it drops the request. Node E records that it received a search with an ID of "abcd" from connection 5. Node F records that it received a search with an ID of "abcd" from connection 6. Node C forwards the search request with an ID of "abcd" on to node D. Because Node D has already seen a message ID of "abcd" from connection I it drops the search request from node C. Nodes C, D, E, and F process the search. Nodes D, E, and F find that they do not have any files that match and thus do not respond. Node C finds that it contains a file named "X" so it sends the message response for "abcd" from connection 2. Node A receives a response from node C on connection 2. Even though the file existed in 3 other locations Node A will only receive one response.

Figure 10:
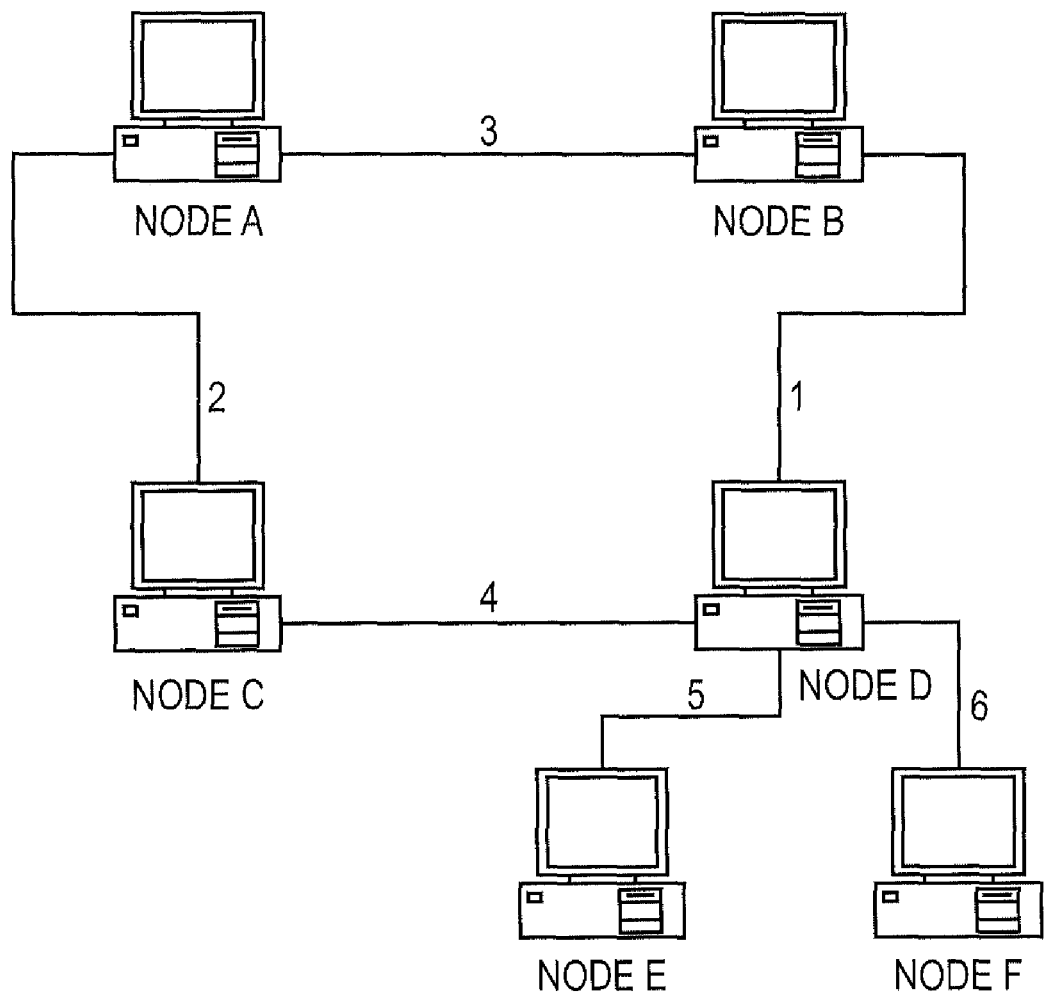
FIG. 10 is a simplified schematic for use in illustration in message saturation discussed below.

In another example of an embodiment of this method, each node on the network in FIG. 10 except node A has the file named "Yellowstone.txt" available. In this network, node B is the pseudonode and is configured to utilize the foregoing low bandwidth saturation method to respond to searches for the file named "Yellowstone.txt."

Assuming Node A issues a search request for the file named "Yellowstone.txt" by sending a request containing the term "Yellowstone.txt" with a message ID of "abcd" to nodes B and nodes C. When Node C receives the search request, it records the message ID. However, when Node B receives the search request it finds that it matches "Yellowstone.txt" which is an object stored and which it has been configured to look for. Node B then replaces the "Yellowstone.txt" search term with "abcdefghijklmnopqrstuvwxyz" and maintains the message ID of "abcd". Node B will then forward this new message to Node D. Node D records this message ID and forwards the message to nodes E, F, and C. Nodes E and F records this message ID. Because Node C has already received a search request with a message ID of "abcd" it drops the search request from node D. Nodes D, E, and F search for files containing "abcdefghijklmnopqrstuvwxyz." Node C, on the other hand, searches for files containing the term "Yellowstone.txt". Nodes D, E, and F will find no files that match and will not respond. Node C will find a file that matches and will respond. The end result is that the file was located in four locations, in this example, but node A only receives one response for the file from one location.

Example 9

This example illustrates a preferred embodiment of the just seen saturation method applied to networks with high bandwidth. In a preferred method, when a pseudonode receives a search request that matches its criteria, it will forward this search request to all other nodes to which it is connected. These nodes will in turn forward the request to all other network nodes they are connected to, and so on. If matches are found on any node, they will respond back through connections that ultimately lead to the pseudonode. Under normal operation of a peer to peer network the pseudonode should forward the search results through it and on to the node that initiated the request. In this method of the present invention, the search is received by the pseudonode and sent on to the other nodes as normal. However, once the response comes back to the pseudonode the pseudonode will drop the results.

This method saturates the network and reduces the overall number of nodes that respond back to the requester.

More specifically and with reference to FIG. 10, if Node A searches for the file "X" by issuing a request for it to its connected nodes (node B and node C), its search request will have a message ID, for example "abcd". Because node B is acting as a pseudonode and is configured to look for searches for file X and because node A sent it a request for file X, node B records that it received a message with an ID of "abcd" on connection 3 and sends the request to node D. Node D records that it received a search with an ID of "abcd" from connection 1 and then forwards the search to nodes E and F. Node E records that it received a search with an ID of "abcd" from connection 5. Node F records that it received a search with an ID of "abcd" from connection 6. Node C records that it received a search with an ID of "abcd" from connection 2 and sends the search on to node D. Because Node D has already seen a message ID of "abcd" from connection 1 it drops the search request from node C. Nodes C, D, E, and F process the search. All nodes find that they have the file and issue search responses for message ID "abcd". Node F looks up message ID "abcd" and finds that it was received from connection 6 so it sends the message response for "abcd" out that connection. Node E looks up message ID "abcd" and finds that it was received from connection 5 so it sends the message response for "abcd" out that connection. Node D receives responses from nodes E and F and also has its own response for message ID "abcd". Node D looks up message ID "abcd" and finds that it was received from connection 1 and forwards its response and the responses of nodes E and F out that connection. Node B receives the response from node D and drops the response. Node B receives the response from node E and drops the response. Node B receives the response from node F and drops the response. Node C looks up message ID "abcd" and finds that it was received from connection 2 so it sends its message response for "abcd" out that connection. Node A receives a response from node C on connection 2. The end result is that the file was located in four locations, in this example, but node A only receives one response for the file from one location.

Example 10

This example illustrates a preferred embodiment of response scrubbing. In a preferred method, when a pseudonode receives a search request that matches its criteria, it will forward this search request to all other nodes to which it is connected. These nodes will in turn forward the request to all other network nodes they are connected to, and so on. If matches are found on any node, it will respond back through connections that ultimately lead to the pseudonode. Under normal operation of a peer to peer network the pseudonode should forward the search results through it and on to the node that initiated the request. In this method of the present invention, the search is received by the pseudonode and sent on to the other nodes as normal. However, once the response comes back to the pseudonode the pseudonode will change the IP address and/or client ID address of the response and then forward the changed response message on to the originator of the search. These can either be totally random addresses or they can be addresses that are configured on the pseudonode. The end result is that the node that initiated the search will be presented with valid file names and file sizes but the locations will be of nodes that do not exist.

This method saturates the network and reduces the overall number of nodes that respond back to the requestor. Moreover, it allows the pseudonode to respond back with file names and file sizes that the requestor would find on any other typical node making them appear valid. File names and file sizes change on peer to peer networks for a variety of reasons. Using this method allows the pseudonode to always respond with the currently accepted file names and file sizes for the files in question.

More specifically and with reference to FIG. 10, if Node A searches for the file "X" by issuing a request for it to its connected nodes (node B and node C), its search request will have a message ID, for example "abcd". Because node B is configured to look for searches for file X and because node A sent it a request for file X, node B records that it received a message with an ID of "abcd" on connection 3 and sends the request to node D. Node D records that it received a search with an ID of "abcd" from connection 1 and then forwards the search to nodes E and F. Node E records that it received a search with an ID of "abcd" from connection 5. Node F records that it received a search with an ID of "abcd" from connection 6. Node C records that it received a search with an ID of "abcd" from connection 2 and sends the search on to node D. Because Node D has already seen a message ID of "abcd" from connection 1 it drops the search request from node C. Nodes C, D, E, and F process the search. All nodes find that they have the file and issue search responses for message ID "abcd". Node F looks up message ID "abcd" and finds that it was received from connection 6 so it sends the message response for "abcd" out that connection. Node E looks up message ID "abcd" and finds that it was received from connection 5 so it sends the message response for "abcd" out that connection. Node D receives responses from nodes E and F and also has its own response for message ID "abed". Node D looks up message ID "abed" and finds that it was received from connection 1 and forwards its response and the responses of nodes E and F out that connection. Node B receives the response from node D and replaces the IP address with a random value and replaces the client ID value with "G". Node B receives the response from node E and replaces the IP address with a random value and replaces the client ID value with "H". Node B receives the response from node F and replaces the IP address with a random value and replaces the client ID value with "I". Node B then looks up message ID "abed" and finds that it was received from connection 3 so it sends the message responses out that connection. Node C looks up message ID "abed" and finds that it was received from connection 2 so it sends its message response for "abed" out that connection. Node A receives responses from D, E & F on connection 3 and a response from node C on connection 2. Node A is presented with 4 files named "X" located at the following locations:

Node G
Node H
Node I
Node C

Because nodes G, H, and I do not exist the user wastes resources trying to retrieve the file.

What is claimed is:

1. A system to locate at least one type of person, via a Peer-to-Peer network, comprising:
   a processor unit for executing the stored instructions to:
      connect to the Peer-to-Peer network;
      issue a Peer-to Peer search on the Peer-to-Peer network, the Peer-to-Peer search including a group of predetermined search terms used as part of information being shared among computers connected to the Peer-to-Peer network, the group of predetermined search terms known to elicit a response from a responding computer having an associated user that is at least one type of person;
      receive a response as a result of the Peer-to-Peer search on the Peer-to-Peer network including the group of predetermined search terms
      send a request to the responding computer to upload a file associated with a file index number starting at N, where N is a real number
      automatically increment the file index number and repeating the request until such time as the responding computer no longer responds;
      receive a response from the responding computer, the response exposing a true Internet Protocol (IP) address of the responding computer; and
      determine a geographic location of the at least one type of person based on the true IP address of the responding computer.

2. A system as set forth in claim 1 wherein the at least one type of person is related to financial accounts, investment accounts, identity theft, or credit card disputes.

3. A system as set forth in claim 1 wherein the at least one type of person is related to corporate executives or corporate operations.

4. A system as set forth in claim 1 wherein the at least one type of person is related to corporate financials.

5. A system as set forth in claim 1 wherein the at least one type of person is related to miscellaneous corporate operations.

6. A method of locating at least one type of person by issuing searches on a Peer-to-Peer network, comprising:
   connecting to the Peer-to-Peer network;
   issuing a Peer-to-Peer search on the Peer-to-Peer network, the Peer-to-Peer search including a group of predetermined search terms used as part of information being shared among computers connected to the Peer-to-Peer network, the group of predetermined search terms known to elicit response from a responding computer having an associated user that is at least one type of person;
   receiving a response as a result of the Peer-to-Peer search on the Peer-to-Peer network including the group of predetermined search terms
   sending a request to the responding computer to upload a file associated with a file index number starting at N, where N is a real number;
   automatically incrementing the file index number and repeating the request until such time as the responding computer no longer responds;
   receiving a response from the responding computer, the response exposing a true Internet Protocol (IP) address of the responding computer; and
   determining a geographic location of the at least one type of person based on the true IP address of the responding computer.

7. A system as set forth in claim 1 wherein the type of person is a person that should not be sharing information that is associated with the at least one search term.

8. A system as set forth in claim 1 wherein the type of person is a person sharing information related to another entity that is associated with the at least one search term.

9. A method as set forth in claim 6 wherein the type of person is a person sharing information that should not be shared.

10. A method as set forth in claim 6 wherein the type of person is a person sharing information related to another entity that is associated with the at least one search term.

11. An apparatus comprising:
   a Peer-to-Peer (P2P) network communication connection, to transmit messages to a plurality of nodes connected in a P2P network, and to receive messages from the nodes connected in the P2P network;
   a processor, connected to the P2P network communication connection, the processor comprising an instruction storage device for storing instructions, an output device, and an instruction execution unit for reading instructions from the storage device and executing the instructions to:
   issue a search message on the P2P network, the search message including a group of predetermined search terms used as part of information being shared among computers connected to the P2P network, the group of predetermined search terms known to elicit a response from a responding computer having an associated user that is at least one type of person;
   receive a response message from a specific P2P node as a result of the issued search;
   send a request to the specific P2P node to upload a file associated with a file index number starting at N, where N is a real number;
   automatically increment the file index number and repeat the request until such time as the specific node no longer responds;
   receive a response from the specific node, the response exposing a true Internet Protocol (IP) address of the specific node; and
   determine a geographic location of the at least one type of person based on the true IP address of the responding computer.

12. An apparatus as set forth in claim 11 wherein the search term is associated with financial accounts, investment accounts, identity theft, or credit card disputes.

* * * * *